UNITED STATES PATENT OFFICE.

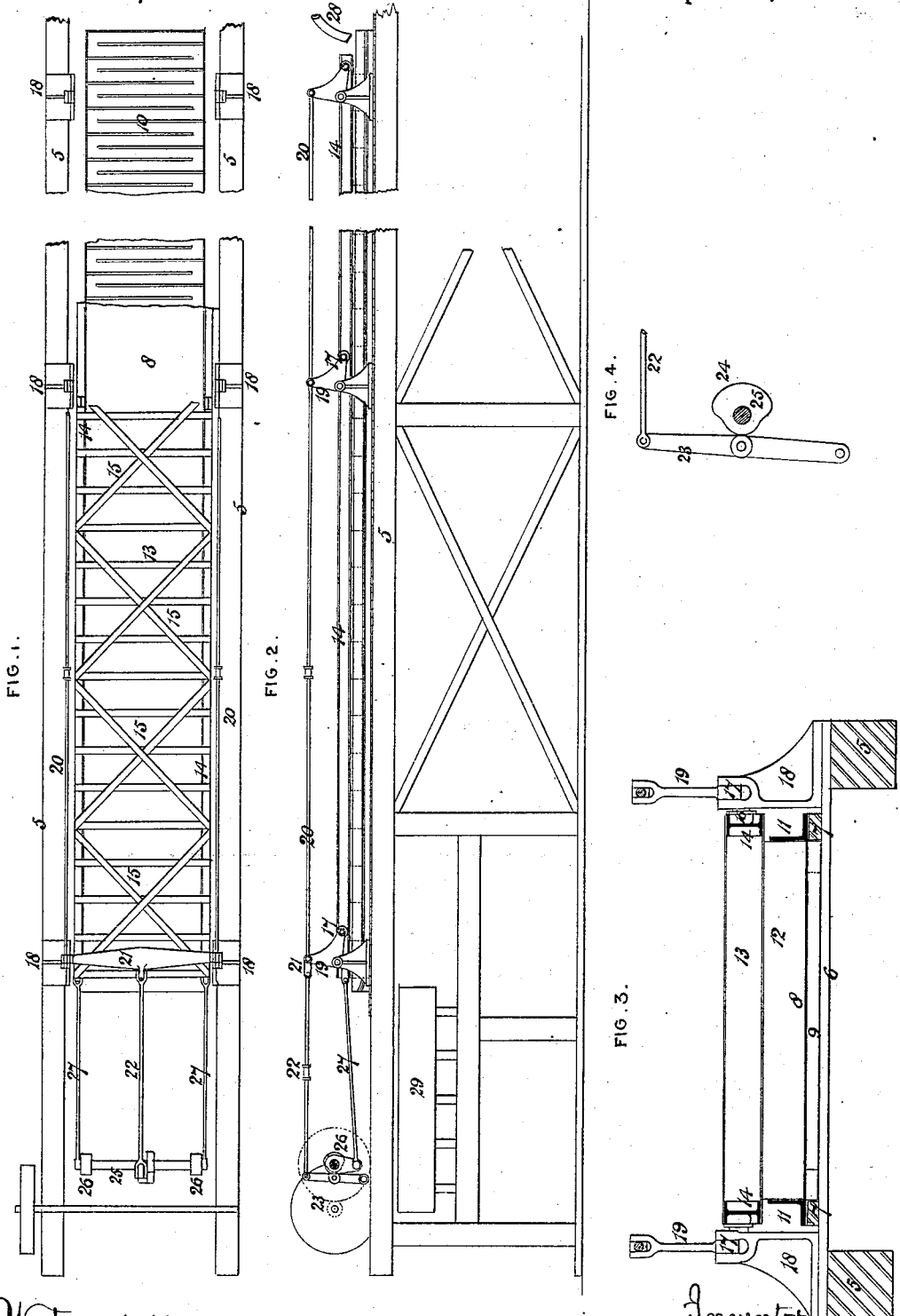

JAMES MACTEAR, OF GLASGOW, COUNTY OF LANARK, SCOTLAND.

APPARATUS FOR MAKING GRANULATED CRYSTALLINE CARBONATE OF SODA.

SPECIFICATION forming part of Letters Patent No. 316,277, dated April 21, 1885.

Application filed June 10, 1884. (No model.)

*To all whom it may concern:*

Be it known that I, JAMES MACTEAR, a subject of the Queen of Great Britain and Ireland, and a resident of Glasgow, county of Lanark, Scotland, have invented certain Improvements in Apparatus for Making Granulated Crystalline Carbonate of Soda, of which the following is a specification.

My invention relates to granulated crystalline carbonate of soda, such as is obtained by the process for which I obtained United States Letters Patent No. 195,142, dated September 11, 1877, and comprises improved apparatus for causing the granular crystallization of carbonate of soda obtained by that process, together with the application of the improved apparatus to carbonate of soda obtained by modifications of the said process or otherwise.

My improved apparatus consists of a long shallow trough, the bottom of which is cooled by water, and which receives the solution of carbonate of soda at one end, the granulated crystals being discharged at the other end. A number of scrapers work in the trough, being fixed to a frame to which a longitudinal reciprocating motion is given by cranks on a rotating shaft. These scrapers move in contact, or nearly so, with the bottom of the trough when moving toward the discharge end; but are lifted during their return movements, and the extent of their movement is greater than the space between two scrapers, so that at each stroke each scraper acts on the granular soda pushed forward during the previous stroke by the scraper next behind it, and in this way the granular soda is gradually moved along the trough and finally discharged.

The apparatus is shown in the accompanying drawings, Figure 1 being a plan with parts broken away or removed, and Fig. 2 being a corresponding side elevation. Fig. 3 is an enlarged transverse vertical section of the trough; and Fig. 4 is an enlarged view of part of the mechanism for lifting the scrapers.

In these drawings the same reference-numerals are used to mark the same or like parts wherever they are repeated.

Upon two longitudinal beams, 5, transverse boards 6 are laid to form a platform for supporting the trough and apparatus. On this platform there are fixed two longitudinal wooden bars or planks, 7, on which is placed an iron plate, 8, to form the bottom of the trough. The space beneath the plate 8 and between the planks 7 forms the space 9 for the cooling-water, and sheet-lead is laid on the bottom of this space and upon the inner sides and tops of the planks 7 to make those parts water-tight. The water-space 9 is furnished with partition-strips 10, (see right-hand side of Fig. 1,) arranged with openings alternately at the opposite sides, to make the current of cooling-water take a tortuous course on its way from one end of the trough to the other. The sides of the trough are formed by angle-iron frames 11. The scrapers 12 are vertical plates formed with angled flanges, by which they are fixed to the under sides of transverse iron frames 13, and these frames 13 are fixed to two longitudinal frames, 14, the frames 13 and 14 being of I or double-channel section, and the combination being rendered rigid by diagonal ties 15. The scraper-frame, consisting of the parts just described, is supported on rollers 16, carried by the lower and nearly horizontal arms, 17, of bell-crank levers, centered on brackets or stools 18, fixed down upon the platform 6, the rollers 16 being entered into the outer channel of the longitudinal frames 14. The bell-cranks are formed with upper nearly-vertical arms, 19, which are jointed to rods 20, extending from one end of the trough to the other, the bell-cranks at the discharge end being jointed to a cross-bar, 21, which is connected by a rod, 22, to a lever, 23. The lever 23 is acted on, as shown in Fig. 4, by a cam, 24, on a rotating shaft, 25, and this same shaft has on its ends cranks 26, for imparting the longitudinal motion to the scraper-frame, to the end of which the cranks are connected by rods 27. The shaft 25 is driven from a steam-engine or other motor through any suitable gearing, and the cranks 26 and the cam 24 are so placed relatively to each as that when the scraper-frame is moving toward the discharge end of the trough the bottom edges of the scrapers 12 move almost in contact with the bottom plate, 8, of the trough, while during the return movement the cam causes the bell-cranks 17 19 to keep the scraper-frame raised. At the ends the bottom of the trough is slightly raised to retain uncrystallized liquid, the part being by preference curved to correspond to the path of the edge of the end scraper when it is being raised from its lowest position.

In using the apparatus the warm solution of carbonate of soda is poured by a pipe, 28, into one end of the trough, and is supplied at a rate sufficient to maintain a depth of about half an inch at the inlet end of the trough. The cold water passing through the space 9 beneath the trough (being by preference supplied at the discharge end and led off at the other end) causes rapid crystallization, and the continually-repeated movements of the scrapers not only prevent the formation of large crystals or masses, but also at the same time move the crystallized soda toward the discharge end of the trough. The granulated soda is discharged into a tank or receptacle, 29, from which it is transferred to a hydro-extractor for the purpose of separating adherent moisture.

In preparing the solution of carbonate of soda for the purpose of being brought into a granulated crystalline form with the aid of apparatus of the kind hereinbefore described, instead of treating the "vat" or "red" liquor in the manner described in my earlier specification, hereinbefore referred to, I convert it by known processes into "soda-ash," preferably of high strength, and then dissolve it in a sufficient quantity of water, and after settling pass the solution thus obtained through the apparatus.

My invention is also advantageously applicable for obtaining the granulated crystalline carbonate of soda from soda-ash or alkali made by the process known as the "ammonia-soda" process, and especially when the ash or alkali used is of high strength, in which case there will be little or no residuary mother-liquor, and no weak alkali need be produced, as is unavoidable with the usual processes for manufacturing ordinary sal-soda.

What I claim as my invention is—

1. The combination of a trough having a cooling-chamber beneath it with a frame carrying a series of scrapers, and levers, substantially as described, for intermittently raising and lowering the frame and for imparting a longitudinal reciprocating motion thereto, substantially as set forth.

2. The combination of the trough having a cooling-chamber beneath it and a frame carrying scrapers with bell-cranks supporting said frame, a cam for operating said bell-cranks, and a crank-shaft and connecting-rod for imparting a reciprocating motion to the scraper-frame, substantially as specified.

In testimony whereof I have signed my name to this specification in the presence of two subscribing witnesses.

JAMES MACTEAR.

Witnesses:
EDMUND HUNT,
DAVID FERGUSON.